United States Patent
Nishi (10) Patent No.: US 12,309,329 B2
(45) Date of Patent: May 20, 2025

(54) IMAGE FORMING APPARATUS TO DISPLAY FIRST IMAGE HAVING FIRST BUTTON AND SECOND IMAGE HAVING SECOND BUTTON IN DISPLAY AREA, AND DECETION DEVICE DETECTS MOVEMENT OF OPERATOR ACCESSES DISPLAY AREA

(71) Applicant: Toshiba Tec Kabushiki Kaisha, Tokyo (JP)

(72) Inventor: Takayuki Nishi, Fujisawa Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/540,612

(22) Filed: Dec. 14, 2023

(65) Prior Publication Data
US 2024/0275893 A1 Aug. 15, 2024

(30) Foreign Application Priority Data
Feb. 15, 2023 (JP) .................. 2023-021904

(51) Int. Cl.
*H04N 1/00* (2006.01)

(52) U.S. Cl.
CPC ..... *H04N 1/00411* (2013.01); *H04N 1/00474* (2013.01); *H04N 1/00477* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 9,311,038 B2* | 4/2016 | Park | G06F 3/1203 |
| 2010/0096382 A1* | 4/2010 | Sakakibara | H05B 6/062 |
| | | | 219/443.1 |
| 2013/0010335 A1* | 1/2013 | Baba | H04N 1/00896 |
| | | | 700/297 |
| 2013/0222831 A1* | 8/2013 | Konosu | H04N 1/00835 |
| | | | 358/1.13 |
| 2018/0275414 A1 | 9/2018 | Tanaka et al. | |
| 2018/0295245 A1* | 10/2018 | Kawaguchi | G02B 27/0172 |

FOREIGN PATENT DOCUMENTS

| | | |
|---|---|---|
| JP | 2012-078571 A | 4/2012 |
| JP | 2022-007868 A | 1/2022 |

* cited by examiner

*Primary Examiner* — Haris Sabah
(74) *Attorney, Agent, or Firm* — FOLEY & LARDNER LLP (57) ABSTRACT

According to one embodiment, an image forming apparatus includes a display, a detection device, and a controller. The display is configured to display a first image including a first button and a second image including a second button in a display area of a space. The detection device detects a movement of an operator that accesses the display area. The controller receives an input of the first button if the operator performs a specific second operation while accessing the first button following a first operation in which the operator accesses the first button of the first image displayed in the display area, displays the second image, and receives an input of the second button if the operator performs the second operation while accessing the second button after the operator accesses the second button without leaving the display area.

20 Claims, 6 Drawing Sheets

FIG. 8

IMAGE FORMING APPARATUS TO DISPLAY FIRST IMAGE HAVING FIRST BUTTON AND SECOND IMAGE HAVING SECOND BUTTON IN DISPLAY AREA, AND DECETION DEVICE DETECTS MOVEMENT OF OPERATOR ACCESSES DISPLAY AREA

CROSS-REFERENCE TO RELATED APPLICATION

This application is based upon and claims the benefit of priority from Japanese Patent Application No. 2023-021904, filed on Feb. 15, 2023, the entire contents of which are incorporated herein by reference.

FIELD

Embodiments described herein relate generally to an image forming apparatus that receives an operation input from a user.

BACKGROUND

In the related arts, an aerial remote control device was devised as an input device that receives various operation inputs from a user in a non-contact manner. For example, if used as a TV remote control, the remote control device displays an image including a power button and a channel selection button in a space, detects the position of the finger pressing the button with a sensor, converts the detection signal into the operation signal of the button, and outputs the operation signal.

According to the remote control device of the related art described above, for example, when pressing the channel selection button after pressing the power button, it is necessary to temporarily remove the finger that pressed the power button from the detection area and press the channel selection button again. As such, when pressing intangible buttons displayed in a space, the stroke of the finger that presses each button inevitably becomes long.

Here, if the display area of the channel selection button that is pressed next to the power button is small, there is a possibility that the button for the wrong broadcasting station will be pressed by mistake. If the user mistakenly presses the channel selection button, it is necessary to remove the finger from the detection area and press the desired channel selection button again.

When pressing a button displayed in a space, the button display area is pressed in a space with the intangible button, and thus the user cannot feel that the button was pressed. Therefore, it is difficult to perform input operations reliably.

DETAILED DESCRIPTION

An object of the present exemplary embodiment is to provide an image forming apparatus that can perform input operations reliably and easily.

In general, according to one embodiment, an image forming apparatus includes a display unit (e.g., a screen, an LCD display, etc.), a detection unit (e.g., a detection device, a camera, a sensor, etc.), and a control unit (e.g., a controller, a control device, etc.). The display unit displays a first image including a first button and a second image including a second button in a display area of a space. The detection unit detects a movement of an operator that accessed the display area. The control unit receives an input of the first button if the operator performs a specific second operation while accessing the first button following a first operation in which the operator accesses the first button of the first image displayed in the display area, displays the second image, and receives an input of the second button if the operator performs the second operation while accessing the second button after the operator accesses the second button without leaving the display area.

Hereinafter, the embodiment will be described with reference to the accompanying drawings. In the present embodiment, an input device 130 of an image forming apparatus having a copy function, a print function, a scan function, a facsimile function, and the like will be described. The input device 130 receives various input operations by the user.

Figure 1:
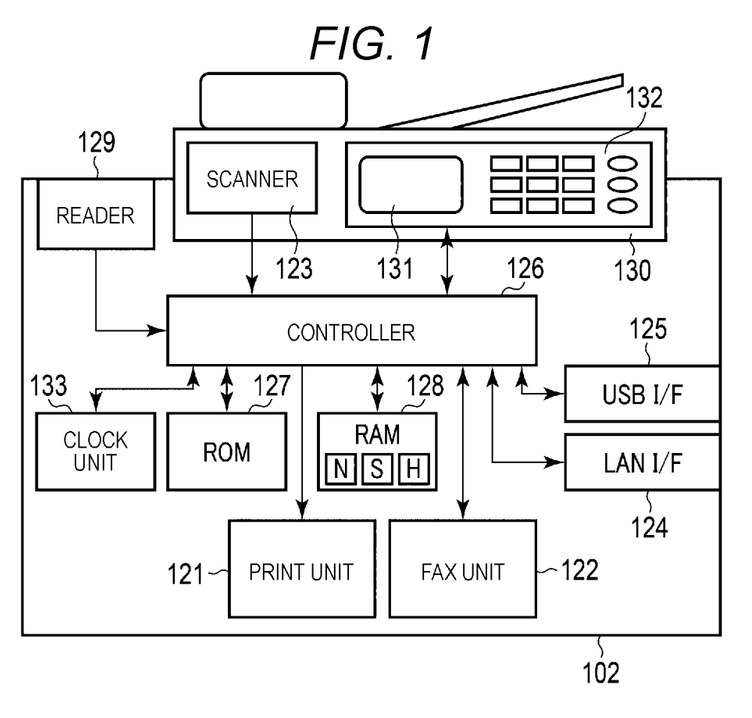
FIG. 1 is an overall configuration view of an image forming apparatus according to the present embodiment.

FIG. 1 is an overall configuration view of an image forming apparatus 102 according to the present embodiment.

The image forming apparatus 102 prints print data provided from a plurality of user terminals connected via a network. The image forming apparatus 102 has multiple functions such as copying, scanning, and facsimile in addition to the above-described printing function. To implement such functions, the image forming apparatus 102 includes a printer unit (e.g., a printer, a printer device, etc.) 121, a facsimile unit (e.g., a facsimile device, etc.)122, and a scanner unit (e.g., a scanning device, a scanner, etc.) 123, as shown in FIG. 1.

The printer unit 121 forms an image (e.g., a picture, text, etc.) using, for example, an electrophotographic method. That is, the printer unit 121 scans and exposes a photoreceptor with a light beam emitted from a laser light source of which lighting is controlled using print data processed for image formation, thereby generating an electrostatic latent image. Next, the printer unit 121 develops the generated electrostatic latent image with toner, and transfers the created toner image to a paper as a recording medium. Next, the printer unit 121 fixes the toner image onto the paper by passing the paper with the toner image transferred through a fixing unit heated by a fixing heater. Thereafter, if post-processing is instructed, the printer unit 121 performs the print-out through the post-processing.

If the facsimile unit 122 receives facsimile image data from the outside via the network, print image data is generated from the facsimile image data and output to the printer unit 121. The facsimile unit 122 transmits facsimile image data formed by the image forming apparatus 102 to the outside via the network.

The scanner unit 123 is disposed on the lower surface of a transparent document platen (not shown). The scanner unit 123 includes a motor for moving and scanning, and performs reciprocating scanning in the sub-scanning direction (e.g., direction perpendicular to the plane of the paper). The scanner unit 123 includes a lamp, a mirror, a CCD as a photoelectric conversion element, and the like. The lamp irradiates a document placed on the document platen with light. The mirror deflects reflected light from the document. The CCD receives an optical image from the mirror and performs photoelectric conversion. The scanner unit 123 reads an image of the document on the document platen by moving in the sub-scanning direction. The read optical image is photoelectrically converted by the CCD, subjected to predetermined processing, and then output as print data to a controller 126, which will be described later.

The image forming apparatus 102 includes a LAN interface 124 and a USB interface 125 as communication units. The LAN interface 124 sends and receives print data, image data, maintenance data, and the like to and from a computer device connected via the network.

The USB interface 125 is connected to various electronic devices having a USB connector, such as a USB memory, and sends and receives print data, image data, maintenance data, and the like.

The image forming apparatus 102 includes the controller 126, a read only memory (ROM) 127, and a random access memory (RAM) 128. The image forming apparatus 102 also includes input and output devices such as the input device 130 and an IC card reader 129.

The controller 126 connects each unit (e.g., device, etc.) such as the printer unit 121, the facsimile unit 122, the scanner unit 123, the LAN interface 124, the USB interface 125, the ROM 127, the RAM 128, the IC card reader 129, and the input device 130. The controller 126 corresponds to the central part of the computer. The controller 126 controls each unit to implement various functions as the image forming apparatus 102 according to an operating system or application programs. The controller 126 functions as a collection unit (e.g., a collector, etc.), a confirmation unit (e.g., a confirmation device, a confirmer, etc.), a processing unit (e.g., a processing device, a processor, etc.), and a restart unit (e.g., a restart device, etc.) in the claims.

The ROM 127 corresponds to the main memory part of the computer. The ROM 127 stores the above operating system and application programs. There is a case where the ROM 127 stores data necessary for the controller 126 to execute processing for controlling each unit (e.g., a device, etc.).

The RAM 128 corresponds to the main memory part of the computer. The RAM 128 stores data necessary for the controller 126 to execute processing. The RAM 128 is also used as a work area where information is appropriately rewritten by the controller 126. The RAM 128 includes, as a work area, a printed sheet number counter N, a setting data storage unit S, a hold data storage unit H that functions as a storage unit (e.g., a storage device, a storage, a memory, etc.) for storing print data of a hold job, and the like.

The printed sheet number counter N stores the number of sheets printed by the printer unit 121. The setting data storage unit S stores setting data such as, for example, threshold values for checking the lifespan of consumable parts, color information for executing print jobs, default values such as paper size, network settings for communicating with a management server, and authentication settings for identifying a user. The hold data storage unit H stores print data (e.g., job data, etc.)) of a print job (e.g., a hold job, etc.) that is waiting for an execution instruction from a user.

The IC card reader 129 reads data from an IC card carried by the user. The IC card reader 129 is, for example, a non-contact short-range wireless communication unit (e.g., a communication device, communicator, etc.). If the user holds the IC card over the IC card reader 129, the IC card reader 129 reads a user ID and the like recorded on the IC card. The user ID is unique user identification information assigned to each user to identify a plurality of users who use the image forming apparatus 102.

Figure 2:
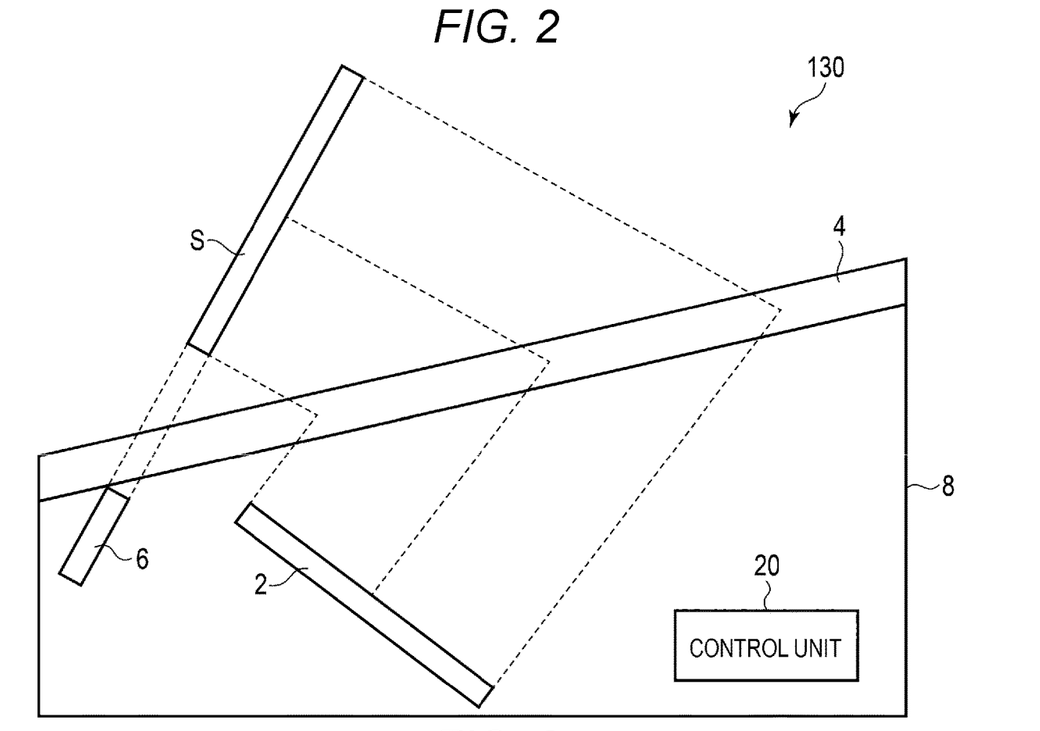
FIG. 2 is a schematic view illustrating an input device.

As shown in FIG. 2, the input device 130 includes a display 2, a reflector 4, a sensor 6, and a control unit 20 (e.g., a controller device, a controller, etc.). The display 2 and the reflector 4 function as a display unit that displays images in a space. The sensor 6 functions as a detection unit that detects the movement of an operator that accesses the image displayed in the space.

The input device 130 also includes a housing 8 that houses the display 2, the sensor 6, and the control unit 20. The housing 8 has four side walls and a rectangular bottom wall. The housing 8 includes the reflector 4 on the upper surface thereof in a state inclined with respect to the horizontal plane. The direction of inclination of the reflector 4 is a direction in which the reflector 4 is slightly inclined upward from the front to the back (e.g., from the left to the right in FIG. 2) when viewed from the user of the input device 130.

Figure 3:
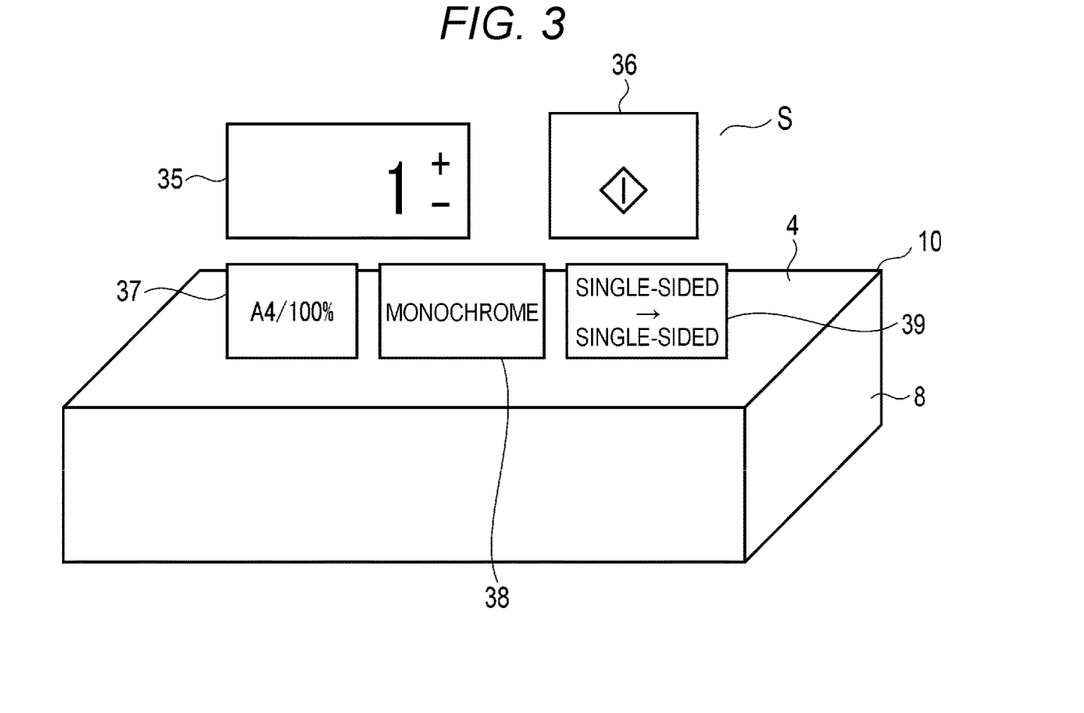
FIG. 3 is a perspective view illustrating a state where an example of a first input operation image is displayed in a space by the input device of FIG. 2.

The input device 130 displays an image via the display 2, reflects the image by the reflector 4, and displays the reflected image in a display area S of the space. The display area S is a position spaced apart above the input device 130, and is an intangible area that appears as an image inclined upward from the front to the back (e.g., upward from the left to the right in FIG. 2) when viewed from the user. FIG. 3 shows an example in which the input device 130 displays a first input operation image in the display area S of the space.

The sensor 6 detects the movement of the operator that accessed (e.g., the image displayed in) the display area S. The "operator" includes, for example, the finger of the user who operates the input device 130, the touch pen held by the user, and the like. "Movement of the operator" includes the movement of the operator entering or exiting the display area S from the outside of the display area S, the lateral movement of the operator that entered the display area S (without leaving the display area S) in the display area S. For example, after the operator enters the display area S, the sensor 6 can detect the operation of touching a button included in the displayed image without the operator leaving the display area S.

The display 2 is, for example, a liquid crystal display, an organic EL display, a plasma display, or the like. The display 2 can switch and display a plurality of images according to the operation of a digital multifunction machine. Alternatively, the display 2 can display a plurality of images side by side or in an overlapping manner. The display 2 is inclined toward the side opposite to the display area S (downward from the front to the back in FIG. 2).

The reflector 4 is, for example, a polarizing plate that reflects incident light and refracts the reflected light in a predetermined direction.

The sensor 6 irradiates the display area S with a planar infrared ray, detects the movement of the operator that blocks the infrared ray, and detects the position at which the operator accesses the display area S, for example. "Access" means, for example, the operation of inserting the operator into the display area S from outside the display area S (that is, for example, the image displayed in a space by the input device 130), or the operation of moving the operator that entered the display area S to a desired position (such as a button) along the display area S without leaving the display area S. In another embodiment, "Access" may also mean an input operation with respect to a button or the like touched by the operator in the switched image if another image is switched and displayed in the display area S in a state where the operator that entered the display area S is stopped at the same position.

The reflector 4 and the sensor 6 have a well-known configuration, and the technology for displaying an image in a space and the technology for detecting access by the operator to the image displayed in a space are well-known technologies, and thus the detailed description thereof will be omitted here.

Figure 4:
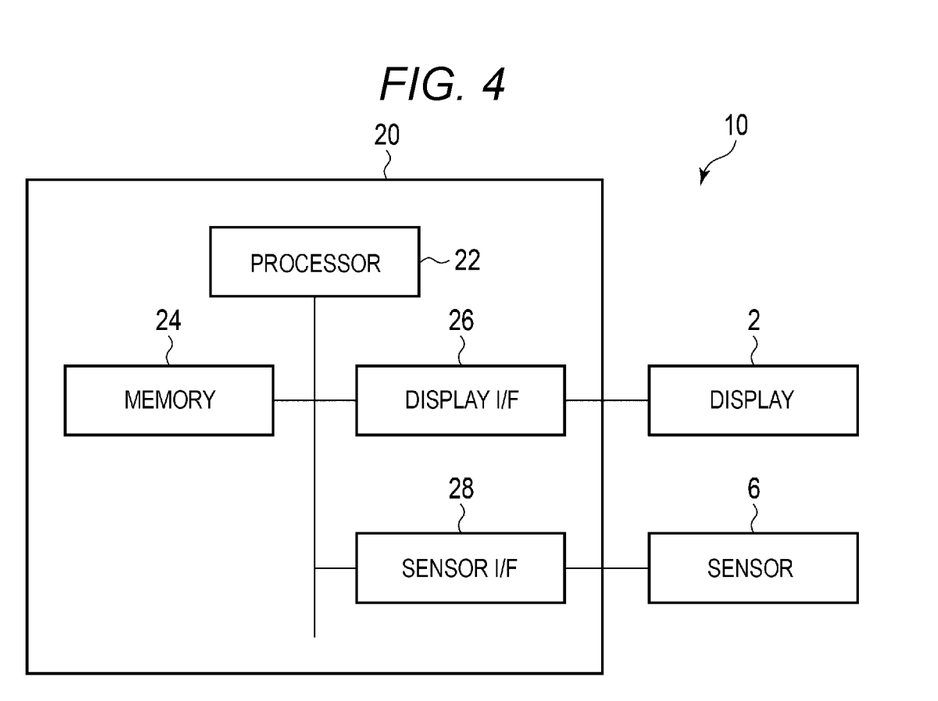
FIG. 4 is a block diagram of a control system of the input device of FIG. 2.

As shown in FIG. 4, the control unit 20 includes a processor 22, a memory 24, a display interface (I/F) 26, and a sensor interface (I/F) 28.

The processor 22 executes arithmetic processing. The processor 22 performs various processing based on, for example, programs stored in the memory 24 and data used in the programs. The memory 24 stores the programs and the data used in the programs.

The display I/F 26 is an interface for transmitting image data to the display 2. The control unit 20 transmits image data to the display 2 via the display I/F 26.

The sensor I/F 28 is an interface for receiving signals from the sensor 6. The control unit 20 receives the detection result regarding "the movement of the operator" via the sensor I/F 28.

An example of the operation of the input device 130 described above will be described below with reference to FIGS. 5 to 8 as well as FIG. 3.

Figure 5:
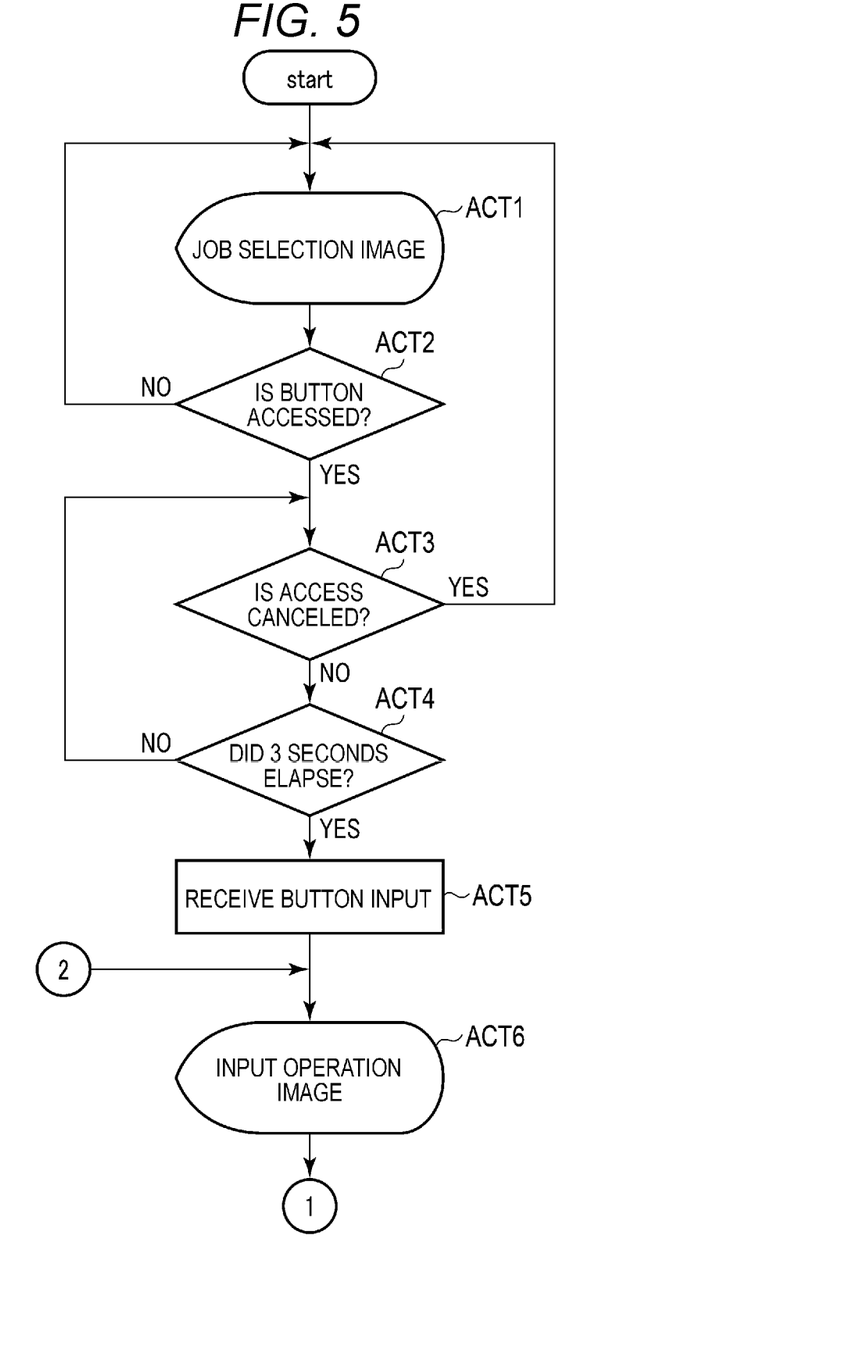
FIG. 5 is a flowchart for describing an operation of the input device of FIG. 2.
Figure 7:
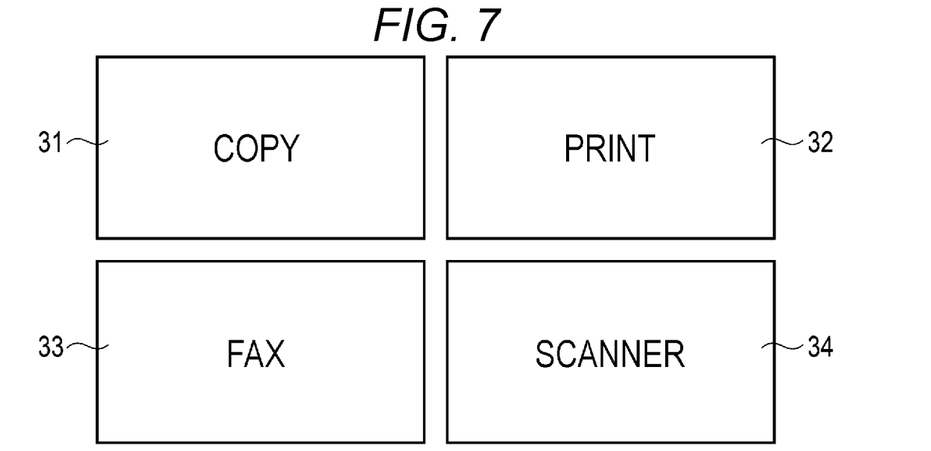
FIG. 7 is a view illustrating an example of a job selection image displayed in a space by the input device of FIG. 2.

The control unit 20 of the input device 130 displays the job selection image (first image) of FIG. 7 in the display area S as ACT 1 in FIG. 5. The job selection image includes, for example, a copy button 31, a print button 32, a FAX button 33, and a scanner button 34. The buttons 31 to 34 are examples of first buttons.

If the user of the input device 130 accesses the display area S (e.g., presses the copy button 31, etc.) by, for example, pressing the copy button 31 (e.g., a first button, etc.) with a finger while the job selection image is displayed in ACT 1, the control unit 20 determines via the sensor 6 that the operator accessed the copy button 31 (e.g., a first operation, etc.) (ACT 2; YES), and proceeds to ACT 3.

Thereafter, without the finger of the user that accessed the copy button 31 leaving from the display area S (ACT 3; NO), if it is determined that the finger of the user remains at the same location (e.g., the location where the copy button 31 is displayed, etc.) for a predetermined period of time (e.g., 3 seconds in the present embodiment) (ACT 4; YES), the control unit 20 receives the input of the copy button 31 in ACT 5, and proceeds to ACT 6. As such, after accessing the display area S, the action of stopping the finger at the same position for a predetermined period of time becomes the second operation.

Note that when receiving the input of the copy button 31 in ACT 5, the control unit 20 may highlight the copy button 31. The highlighting is to make the user aware that the copy button 31 was pressed. For example, the area of the copy button 31 may be displayed slightly larger or the copy button 31 may be reversed and displayed. The control unit 20 may highlight the copy button 31 if it is determined that the copy button 31 was accessed in ACT 2.

After receiving the input of the copy button 31 in ACT 5, the control unit 20, in ACT 6, displays the function selection image (e.g., a second image, etc.) of FIG. 3 in the display area S as the first input operation image instead of the job selection image of FIG. 7. When switching from the first image to the second image, the finger of the user remains in the state of accessing the display area S. The function selection image of FIG. 3 includes, for example, a copy number button 35, a start button 36, a paper/magnification button 37, a monochrome/color button 38, and a single-sided/double-sided button 39. The buttons 35 to 39 are examples of second buttons, but other types of buttons are possible.

If the function selection image is displayed in ACT 6, as the user of the input device 130 does not remove the finger from the display area S (ACT 7 in FIG. 5; NO) and accesses, for example, the single-sided/double-sided button 39 (e.g., second button, etc.) (ACT 8; YES), the control unit 20 proceeds to ACT 9.

Access to the single-sided/double-sided button 39 in ACT 8 is usually an operation of moving the finger placed in the display area S to the single-sided/double-sided button 39 along the display area S. However, if the single-sided/double-sided button 39 of the function selection image displayed in ACT 6 is displayed in the same position as the copy button 31 of the job selection image displayed in ACT 1, access to the single-sided/double-sided button 39 of ACT 8 is an example of an operation of stopping the finger at the same position without moving the finger.

After the user accesses the single-sided/double-sided button 39 (ACT 8; YES), without the finger of the user leaving from the single-sided/double-sided button 39 in the display area S (ACT 9; NO), if it is determined that a predetermined period of time (e.g., 3 seconds in the present embodiment) elapsed (second operation) (ACT 10; YES), in ACT 11, the control unit 20 receives the input of the single-sided/double-sided button 39, and proceeds to ACT 12.

Note that if the input of the single-sided/double-sided button 39 is received in ACT 11, the control unit 20 may highlight the single-sided/double-sided button 39. The highlighting is to make the user aware that the single-sided/double-sided button 39 was pressed. For example, the area of the single-sided/double-sided button 39 may be displayed slightly larger or the single-sided/double-sided button 39 may be reversed and displayed. The control unit 20 may highlight the single-sided/double-sided button 39 if it is determined that the single-sided/double-sided button 39 was accessed in ACT 8.

Figure 8:
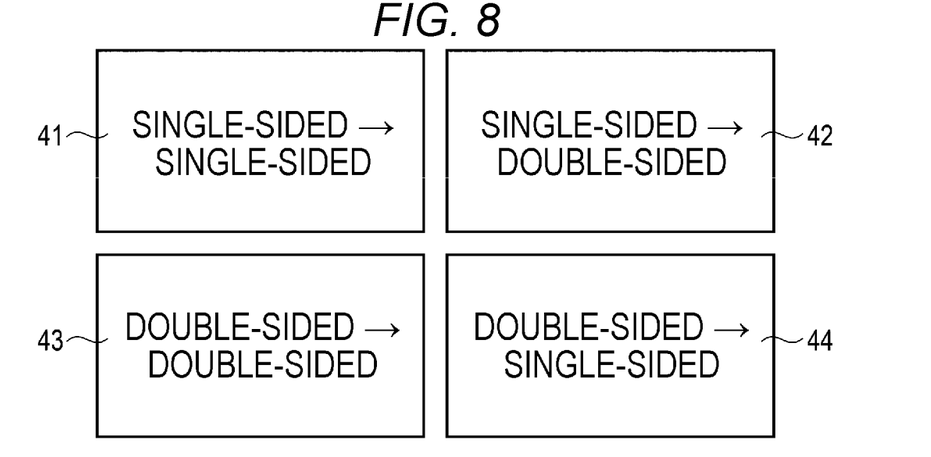
FIG. 8 is a view illustrating an example of a second input operation image displayed in a space by the input device of FIG. 2.

After receiving the input of the single-sided/double-sided button 39 in ACT 11, the control unit 20 determines whether the next image exists in ACT 12, proceeds to ACT 6, and displays the single-sided/double-sided selection image of FIG. 8 in the display area S as the second input operation image instead of the function selection image of FIG. 3. Here, the finger of the user remains in the state of accessing the display area S. The single-sided/double-sided selection image includes a single-sided→single-sided button 41, a single-sided→double-sided button 42, a double-sided→double-sided button 43, and a double-sided→single-sided button 44.

Thereafter, the control unit 20 executes ACT 7 to ACT 11 while the single-sided/double-sided selection image of FIG. 8 is displayed. Here, for example, if the user accesses any of the buttons 41 to 44 (ACT 8; YES) and the control unit 20 receives the button input in ACT 11, the control unit 20 determines whether the next image exists in ACT 12, switches the single-sided/double-sided selection image of FIG. 8 to the function selection image of FIG. 3 (ACT 6), and waits for an input of the start button 36 by the user in ACT 7 to ACT 11.

Next, if the user inputs the start button 36 (ACT 11), the control unit 20 determines that there is no next image in ACT 12 (ACT 12; NO), and after the finger of the user is removed from the start button 36 (ACT 13; YES), the control unit 20 proceeds to ACT 1 to display the job selection image and ends the input operation reception processing.

If the user cancels access without selecting a button (ACT 8; NO) while the input operation image is displayed in ACT 6 (ACT 7; YES), and if the access is canceled (ACT 9; YES) after the user selects the button in ACT 8 (ACT 8; YES) and before the predetermined period of time elapses (ACT 10; NO), the control unit 20 proceeds to ACT 14.

After proceeding to ACT 14, if there is no access (e.g., determined by a timer, etc.) by the user for a certain period of time (for example, 1 minute) (ACT 14; YES), the control unit 20 proceeds to ACT 1 of FIG. 5, switches to the job selection image of FIG. 7, and ends the input operation reception processing. Note that if there is an access before the predetermined period of time elapses (ACT 14; NO, ACT 15; YES), the control unit 20 proceeds to ACT 7.

As described above, according to the present embodiment, after inputting the first button in the first image displayed in a space, the second button in the second image can be input without removing the operator from the display area S of the image, and thus, there is no need to move the operator back and forth to perform inputs to a plurality of buttons. Therefore, the problem of pressing the wrong button by mistake is less likely to occur, and the input operation of the second button after the image is switched can be performed reliably and easily.

Figure 6:
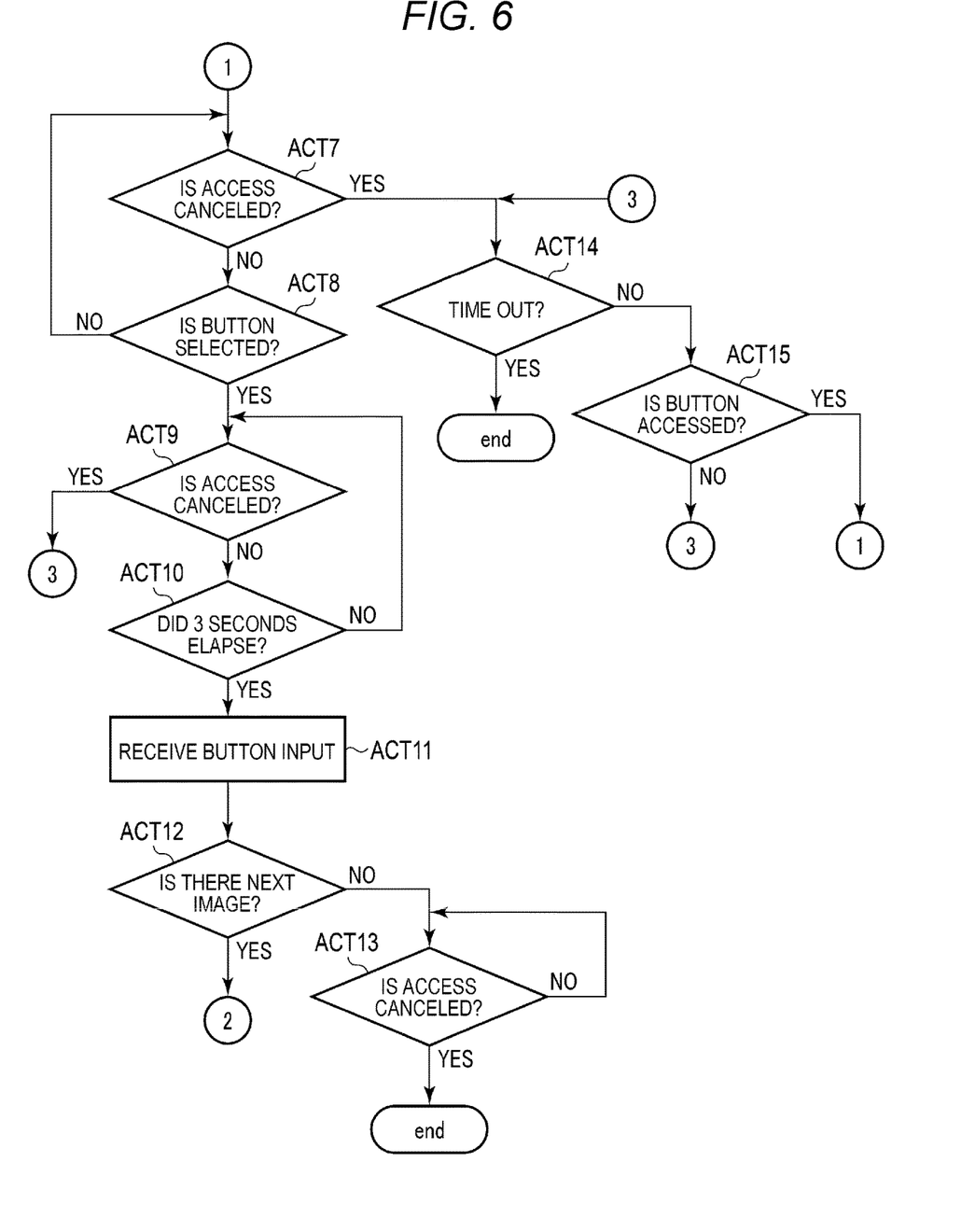
FIG. 6 is a flowchart for describing the operation of the input device of FIG. 2.

In the present embodiment, if the input of the second button is received in ACT 11 of FIG. 6, the second button is highlighted, and thus the user can be aware that the second button was successfully input, and can perform reliable input operations. By highlighting the second button if the second button is accessed in ACT 8, the user can reliably access the second button.

In the above-described embodiment, as the second operation of the operator to determine the reception of button input in ACT 5 and ACT 11, the operation of stopping the operator for 3 seconds is detected, but the stopping time of the operator may be set in any manner. Instead of determining the second operation by the operator stopping for a certain period of time, for example, based on the change in the detection area of the operator if the operator is pushed further toward the display area S, the second operation may be determined, and an operation in which the operator rotates at the position where the display area S is accessed may be detected as the second operation.

The second operation of the operator, which is the determination reference for receiving the button input in ACT 5, and the second operation of the operator, which is the determination reference for receiving the button input in ACT 11, may be different operations. For example, if the second button is accessed and then stopped for 3 seconds, the button input may be received as ACT 5, and if the second button is accessed and then the operator is further pushed, the button input may be received as ACT 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus that forms an image on an image forming medium, the apparatus comprising:
    a display configured to display, in a display area, a first image including a first button and a second image including a second button;
    a detection device configured to detect a movement of an operator that accesses the display area; and
    a controller configured to:
        receive an input of the first button if the operator performs a specific second operation while accessing the first button following a first operation in which the operator accesses the first button of the first image displayed in the display area,
        display the second image,
        receive an input of the second button if the operator performs the second operation while accessing the second button after the operator accesses the second button without leaving the display area, and
        in response to determining that the operator accessed the second button without leaving the display area and that the operator moved away from the display area before a first predetermined period of time elapsed, set a timer for a second predetermined period of time.

2. The apparatus according to claim 1, wherein the second operation includes an operation in which the operator stops for the first predetermined period of time.

3. The apparatus according to claim 1, wherein the second operation includes an operation of pushing the operator toward the display area.

4. The apparatus according to claim 1, wherein the second operation includes an operation of rotating the operator at a position where the display area is accessed.

5. The apparatus according to claim 1, wherein the display highlights a button of which an input is received by the controller.

6. The apparatus according to claim 1, wherein the detection device is a sensor.

7. The apparatus according to claim 1, further comprising a reflector configured to reflect incident light and refract the reflected light in a predetermined direction.

8. The apparatus according to claim 1, wherein the first button is at least one of a copy button, a print button, a FAX button, or a scanner button, and the second button is at least one of a single-sided button or a double sided button.

9. A method of forming an image comprising:
    displaying a first image;
    determining that an operator accessed a first button in a first location and that the operator remains in the first location for a predetermined period of time;
    receiving, by a controller, an input of the first button;
    displaying a second image, the second image comprising a second button;
    determining that the operator accessed the second button in a second location;
    in response to the operator accessing the second button in the second location, determining at least one of the operator remaining in the second location for the predetermined period of time or the operator performing an operation;

in response to determining that the operator accessed the second button in the second location and that the operator moved away from the second location before the predetermined time elapsed, setting a timer for a second predetermined period of time;

receiving, by the controller, an input of the second button.

10. The method of claim 9, wherein the operation is at least one of the operator moving toward a display area, or the operator rotates at a position where the display area is accessed.

11. The method of claim 10, further comprising canceling, by the operator, the selected access to one of the first button or the second button.

12. The method of claim 9 further comprising highlighting the first button in response to determining that the operator accessed the first button and that the operator remained in the first location for the predetermined period of time.

13. The method of claim 9, wherein the first image is a job selection image and the second image is a function selection image.

14. The method of claim 9, wherein the second location is identical to the first location and the predetermined time period is 3 seconds.

15. The method of claim 9, wherein in response to determining that the operator accessed the first button in the first location and that the operator moved away from the first location before the predetermined time elapsed, display the first image.

16. The method of claim 2, wherein the predetermined time is 1 minute and the method further comprises:

determining the operator accessed the second button a second time;

in response to determining the operator accessed the second button a second time, determining if the operator remained in the second location for the predetermined time;

in response to the operator remaining in the second location for the predetermined time, receiving the second button input.

17. The method of claim 9, further comprising highlighting the second button in response to determining that the operator accessed the second button and that the operator remained in the second location for the predetermined period of time.

18. The method of claim 9, further comprising:
determining a third image exists; and
displaying the second image.

19. The method of claim 18, wherein the first image is a job selection image, the second image is an input operation image, and the third image is a second input operation image.

20. A method of forming an image comprising:
displaying a first image;
determining that an operator accessed a first button in a first location and that the operator remains in the first location for a predetermined period of time;
receiving, by a controller, an input of the first button;
displaying a second image, the second image comprising a second button;
determining that the operator accessed the second button in a second location;
in response to the operator accessing the second button in the second location, determining at least one of the operator remaining in the second location for the predetermined period of time or the operator performing an operation;
in response to determining that the operator accessed the second button in the second location and that the operator moved away from the second location before the predetermined time elapsed, setting a timer for a second predetermined period of time;
receiving, by the controller, an input of the second button;
determining the operator accessed the second button a second time;
in response to determining the operator accessed the second button a second time, determining if the operator remained in the second location for the predetermined time; and
in response to the operator remaining in the second location for the predetermined time, receiving the second button input.

* * * * *